US012679281B1

(12) United States Patent
Larin

(10) Patent No.: US 12,679,281 B1
(45) Date of Patent: Jul. 14, 2026

(54) GOLF BAG TROLLEY SYSTEM FOR TRUCK BED

(71) Applicant: Golf Bag Truck Trolley LLC, Cave Creek, AZ (US)

(72) Inventor: Timothy Larin, Cave Creek, AZ (US)

(73) Assignee: Golf Bag Truck Trolley LLC, Cave Creek, AZ (US)

( * ) Notice: Subject to any disclaimer, the term of this patent is extended or adjusted under 35 U.S.C. 154(b) by 0 days.

(21) Appl. No.: 19/388,258

(22) Filed: Nov. 13, 2025

Related U.S. Application Data

(60) Provisional application No. 63/744,084, filed on Jan. 10, 2025.

(51) Int. Cl.
 B60R 9/06 (2006.01)
 B60R 9/08 (2006.01)

(52) U.S. Cl.
 CPC . B60R 9/06 (2013.01); B60R 9/08 (2013.01)

(58) Field of Classification Search
 CPC ..... B60R 9/06; B60R 7/00; B60P 3/00; B60P 7/0807; B60P 3/12; B60P 3/06; B62D 33/02
 See application file for complete search history.

(56) References Cited

U.S. PATENT DOCUMENTS

| | | | |
|---|---|---|---|
| 2,852,303 A | 9/1958 | Hopson | |
| 2,950,126 A | 8/1960 | Armentrout | |
| 4,573,731 A * | 3/1986 | Knaack ................... | B60R 11/06 |
| | | | 224/404 |

| | | | | |
|---|---|---|---|---|
| 5,456,511 A * | 10/1995 | Webber | ..................... | B60P 1/00 |
| | | | | 296/57.1 |
| 5,934,725 A * | 8/1999 | Bowers | ..................... | B60P 3/40 |
| | | | | 414/522 |
| 5,964,492 A * | 10/1999 | Lyon | ......................... | B60R 9/00 |
| | | | | 224/404 |
| 6,099,232 A * | 8/2000 | Dixon | ................... | B60P 1/6454 |
| | | | | 414/500 |
| 6,860,536 B1 * | 3/2005 | Schimunek | ............. | B60R 13/01 |
| | | | | 296/37.6 |
| 6,923,354 B2 * | 8/2005 | Axelson | ................... | B60R 9/00 |
| | | | | 224/547 |
| 7,111,884 B2 * | 9/2006 | Johnson | .................. | B60R 11/06 |
| | | | | 296/26.1 |

(Continued)

OTHER PUBLICATIONS

International Search Report & Written Opinion by ISA/US of PCT/US25/55304, dated Feb. 5, 2026.

*Primary Examiner* — Brian D Nash
(74) *Attorney, Agent, or Firm* — Batt IP A Law Corporation; Richard Batt

(57) ABSTRACT

A golf bag trolley system for receiving and storing objects in a bed of a truck. The golf bag trolley system comprises a frame and cart movable between a retracted configuration for storing an object, and an extended configuration for receiving the object. The cart comprises a drawbridge that is lowerable to span the gap between the truck bed and the truck tailgate. After the drawbridge is lowered, the cart can be rolled across the gap. The system is collapsible and portable. The walls of the cart are configurable to create a custom number or shape of chambers for holding objects. The walls of the cart may incorporate a second rail system for accommodating a second cart to receive and store a second object within the truck bed.

21 Claims, 16 Drawing Sheets

(56) References Cited

U.S. PATENT DOCUMENTS

| | | | | |
|---|---|---|---|---|
| 7,175,060 | B1 * | 2/2007 | Carpenter | B60R 5/04 |
| | | | | 224/403 |
| 7,338,104 | B1 * | 3/2008 | Bejin | B62D 33/0273 |
| | | | | 224/403 |
| 7,543,873 | B1 * | 6/2009 | Thornsberry | B60P 1/003 |
| | | | | 224/403 |
| 8,240,527 | B1 * | 8/2012 | Casselton | B60R 9/065 |
| | | | | 224/404 |
| 9,527,454 | B2 | 12/2016 | Smith et al. | |
| 10,464,492 | B1 * | 11/2019 | Linn | B60J 7/102 |
| 10,829,059 | B1 * | 11/2020 | Addison | B60P 1/433 |
| 11,124,247 | B2 * | 9/2021 | Sosnowich | B62D 33/0207 |
| 11,292,532 | B1 * | 4/2022 | Heinzelman | B60R 5/041 |
| 11,667,337 | B2 * | 6/2023 | Ishii | E05B 83/18 |
| | | | | 296/57.1 |
| 12,246,653 | B2 * | 3/2025 | Willis | B60R 11/00 |
| 2003/0146636 | A1 | 8/2003 | Keller | |
| 2010/0096872 | A1 * | 4/2010 | Brogdon | B60R 11/00 |
| | | | | 296/3 |
| 2016/0101740 | A1 | 4/2016 | Patton et al. | |
| 2017/0129548 | A1 * | 5/2017 | Krishnan | B60R 9/065 |
| 2017/0217358 | A1 | 8/2017 | Paunov | |
| 2019/0308674 | A1 * | 10/2019 | Crawford | B62D 33/02 |
| 2019/0315285 | A1 | 10/2019 | Steinhauser | |
| 2021/0129922 | A1 * | 5/2021 | Agarwal | B60P 1/003 |
| 2022/0055542 | A1 | 2/2022 | Kane | |
| 2023/0227114 | A1 * | 7/2023 | Dylewski, II | B62D 33/0273 |
| | | | | 296/26.09 |
| 2023/0249759 | A1 * | 8/2023 | Dylewski, II | B60P 1/003 |
| | | | | 296/26.08 |
| 2023/0406417 | A1 * | 12/2023 | Chimento | B62D 33/08 |
| 2024/0132165 | A1 * | 4/2024 | Dylewski, II | B60P 1/003 |
| 2025/0058715 | A1 * | 2/2025 | Wilcox | B60R 9/06 |

* cited by examiner

GOLF BAG TROLLEY SYSTEM FOR TRUCK BED

CROSS-REFERENCE TO RELATED APPLICATIONS

This claims priority to provisional application No. 63/744,084, filed Jan. 10, 2025, and entitled "GOLF BAG TROLLEY SYSTEM FOR TRUCK BED."

BACKGROUND OF THE INVENTION

This invention relates to vehicle storage systems, and in particular to a trolley system for storing objects in a truck bed.

Use of golf bags is well established. For truck owners, the golf bag is transported to and from the golf course in the truck bed. To this end, the owner opens the tailgate, places the golf bag in the entrance to the truck bed, slides the bag along the floor until the bag is safely within the bed chamber, and then closes the tailgate.

Repeating this process, however, destroys the golf bag. Sliding the bag along the floor prematurely wears the golf bag by months perhaps years. This is highly undesirable.

Accordingly, there is a need for improved systems having features and aspects described herein.

SUMMARY OF THE INVENTION

A trolley system for storing an object in a truck bed comprises: a cart comprising a base and a plurality of rollers arranged on the base; and a guide rail system securable to a wall of the truck bed and cooperating with the cart to guide and roll the cart directly along the truck bed between a retracted configuration for storing the object in the truck bed and an extended configuration for receiving the object.

In embodiments, the cart comprises a base, a first side wall, at least one guide arranged on the side wall, and a plurality of rollers arranged on the base, wherein the guide and plurality of rollers are operable with the frame and the truck bed to contact and roll the cart directly along the truck bed between a retracted configuration for storing the object in the truck bed and an extended configuration for receiving the object.

In embodiments of the invention, the cart comprises a deck or a drawbridge operable between a first (or raised) position closing the front of the first cart, and a deployed (or lowered) position, over which the first cart may roll across a gap formed between the truck bed and a tailgate when the tailgate is open.

In embodiments of the invention, the drawbridge is in pivotable, optionally hinged, engagement with a side wall of the first cart. In embodiments, the drawbridge is removably coupled to the first cart. In embodiments, the drawbridge is tethered by a flexible member (e.g., a strap, chain, string, etc.) to the side wall. In embodiments, a deck is removably installed to the side wall of the cart in an upright position for enclosing the object in the cart, or a second deployed position across the gap between the door and the bed of the truck as described herein. In embodiments, the deck is secured in the upright position by a cooperating tongue and groove (or slot) arrangement between the deck edges and the walls of the cart. In embodiments, the user may slide the deck into and out of the cart to form the enclosed chamber by advancing tabs in the deck within grooves in the side walls of the cart.

In embodiments of the invention, the drawbridge comprises tracks within which the rollers of the first cart align and travel across.

In embodiments of the invention, the frame comprises an extendable first rail and a stop arranged at an end of the first rail, and wherein the guide of the first cart and first rail cooperate together to guide the cart out of the truck bed until the first cart contacts the stop.

In embodiments of the invention, the first rail and stop cooperate together and are operable such that rotation of the stop causes the first rail to lock and unlock.

In embodiments of the invention, the frame further comprises a second rail lower than the first rail, and wherein the at least one guide on the first cart comprises a plurality of guides at least one of which cooperates with the lower rail to support the cart tracking into and out of the truck bed.

In embodiments of the invention, each of the guides are clip-shaped.

In embodiments of the invention, the frame comprises a cage-like structure that is arranged around or over a wheel well of the truck bed.

In embodiments of the invention, the frame comprises a plurality of legs.

In embodiments of the invention, each of the legs comprises a foot pad.

In embodiments of the invention, the frame is collapsible into a folded configuration. In embodiments, the frame is configured or operable to be disassembled into a compacted state. In embodiments, the frame comprises a plurality of separable detachable elements or members which are adapted to be coupled or secured together into the frame for supporting the trolley in a first configuration, and can be disassembled into a reduced size or compacted configuration in a second configuration.

In embodiments of the invention, the frame is secured to the truck bed via a strap ratcheting system or mounting brackets.

In embodiments of the invention, the frame is permanently secured to the truck bed via fasteners.

In embodiments of the invention, the position of the rollers along the base is adjustable for aligning the rollers with grooves in the truck bed. In embodiments of the invention, the position of the rollers along the base are selectively adjustable to permit alignment with one or more channels, grooves, or corrugations formed in the truck bed, thereby ensuring smooth movement and stable support of the transported load.

In embodiments of the invention, the first cart comprises slots or tabs for supporting walls in multiple different configurations. In embodiments of the invention, the first cart includes one or more engagement features, such as slots, tabs, channels, or coupling interfaces, that are configured to receive and support wall panels in a plurality of selectable orientations or configurations, thereby allowing reconfiguration of the cart enclosure to accommodate various load types or operational modes.

In embodiments of the invention, the first cart comprises a second wall opposite of the first wall.

In embodiments of the invention, the system further comprises a second rail system disposed on an exterior of the second wall for guiding a second cart.

In embodiments of the invention, the second cart is movable between a retracted configuration for storing the object in the truck bed and an extended configuration for receiving the object.

In embodiments of the invention, the first cart is shaped and sized to accommodate a golf bag. Optionally, the first cart comprises a soft gently curving cavity adapted to receive a cylindrical-shaped golf bag. In embodiments, the cavity is formed of a smooth soft elastic material upon which the golf bag is placed. In embodiments, a consumable pad is mounted or bonded to the base of the cart, and includes a recess to accommodate a typical sized golf bag. The pad is replaced when needed. Optionally, a plurality of different types of pads vary in softness, shape (corresponding to different shaped golf bags), color, and water resistance (some climates may require more water resistance than others).

In embodiments of the invention, a trolley system for storing an object in a truck bed comprises: a frame securable to a wall of the truck bed; and a first cart comprising a base, a first side wall, and a plurality of rollers arranged on the base, wherein the first cart and plurality of rollers are operable with the frame and the truck bed to contact and roll the cart directly along the truck bed between a retracted configuration for storing the object in the truck bed and an extended configuration for receiving the object, and wherein the frame comprises an extendable first rail and a stop arranged at an end of the first rail, and wherein a guide of the first cart and first rail cooperate together to guide the cart out of the truck bed until the first cart contacts the stop.

In embodiments of the invention, a trolley system for storing an object in a truck bed comprises: a cart comprising a base and a plurality of rollers arranged on the base; and a guide rail system securable to a wall of the truck bed and cooperating with the cart to guide and roll the cart directly along the truck bed between a retracted configuration for storing the object in the truck bed and an extended configuration for receiving the object.

Objects and Advantages

In embodiments, an object and advantage of the system is incorporation of rollers or wheels with the cart. The rollers directly contact and roll along the troughs in the truck bed. The weight of the object and cart are thus transferred onto the truck bed and not to the guide rails of the frame. This is an advantage to accept heavier objects without risking damage to the frame.

In embodiments, an object and advantage of the system is a drawbridge over which the cart travels. The drawbridge can be manually lowered by hand to span the gap or crevasse formed between the truck bed and the tailgate. Optionally, tracks in the drawbridge support, receive, and align the rollers as the cart rolls across the bridge.

In embodiments, an object and advantage of the system is that it can be removed. The system, in embodiments, may be folded or collapsible, and is portable. The user can conveniently install and remove the trolley system from the truck bed.

In embodiments, an object and advantage of the system is that a modular and adaptable design ensures the frame and trolley meet diverse payload requirements while providing secure and efficient loading and unloading in various pickup trucks.

The description, objects and advantages of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Overview

Figure 1:
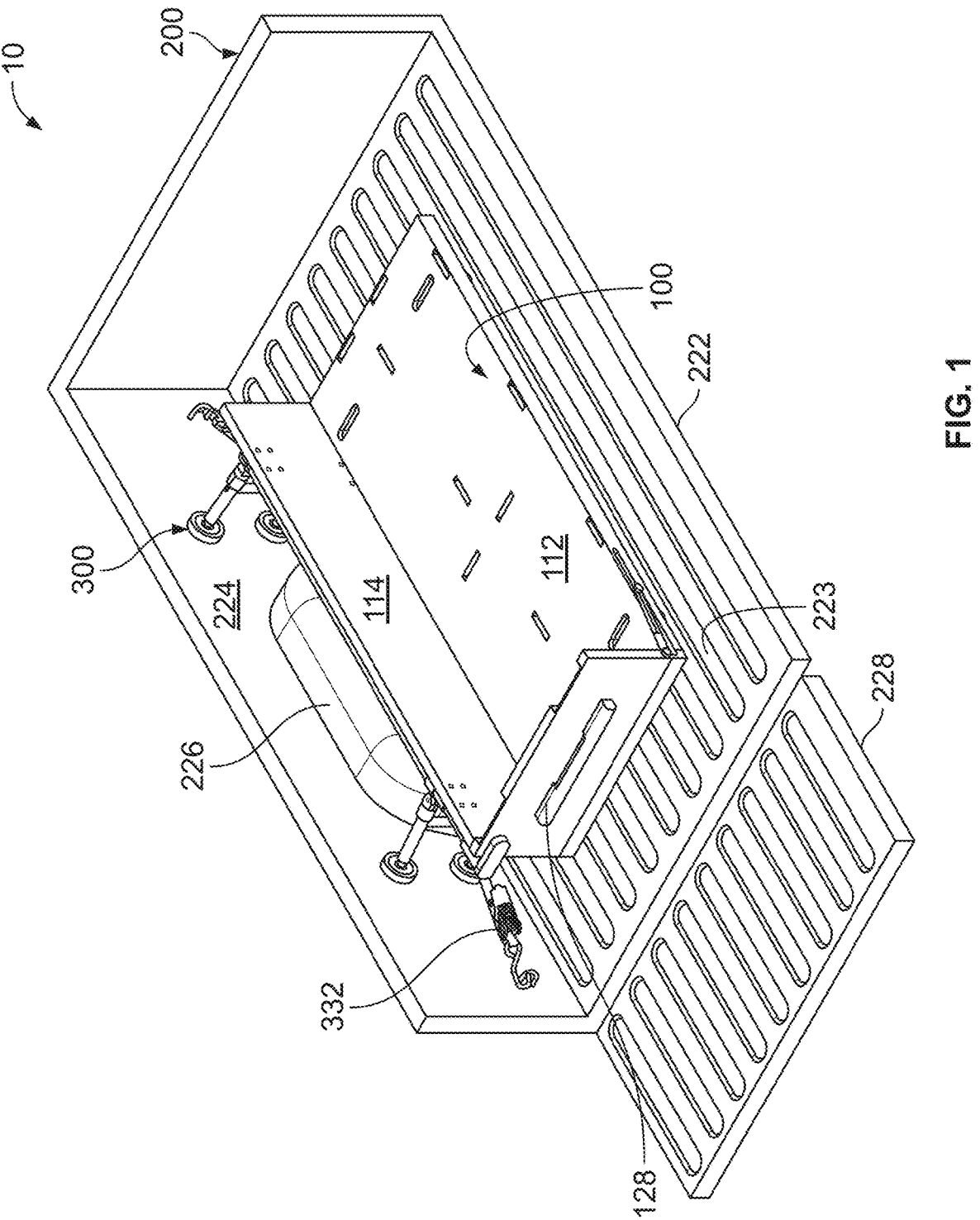
FIG. 1 is a top front right-side perspective view of a trolley system in a retracted configuration in a truck bed in accordance with an embodiment of the invention.
Figures 2A, 2B:
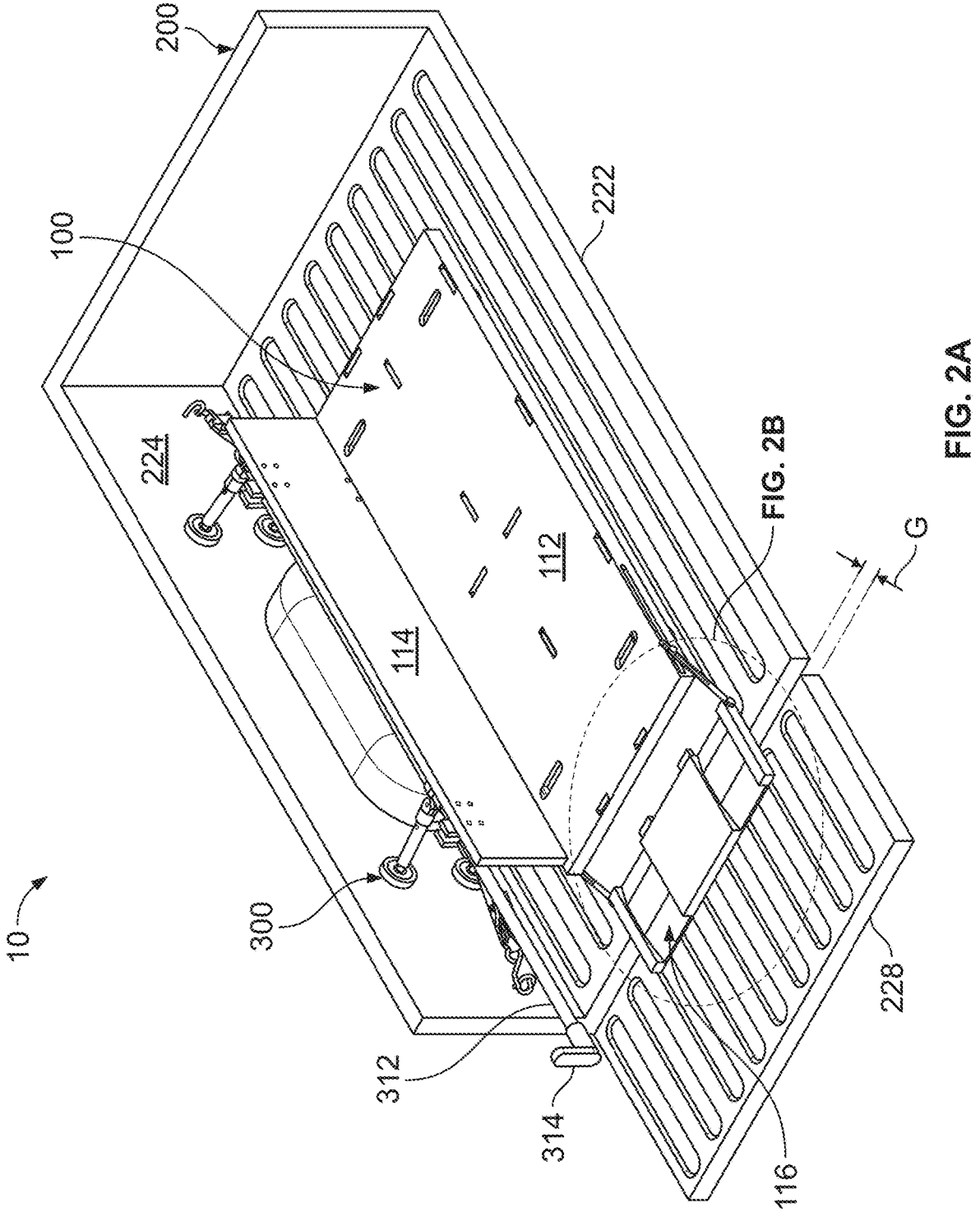
FIG. 2A is a top front right-side perspective view of the trolley system shown in FIG. 1 in an intermediate configuration in accordance with an embodiment of the invention.
FIG. 2B is an enlarged view of a portion of the trolley system shown in FIG. 2A.
Figure 2B:
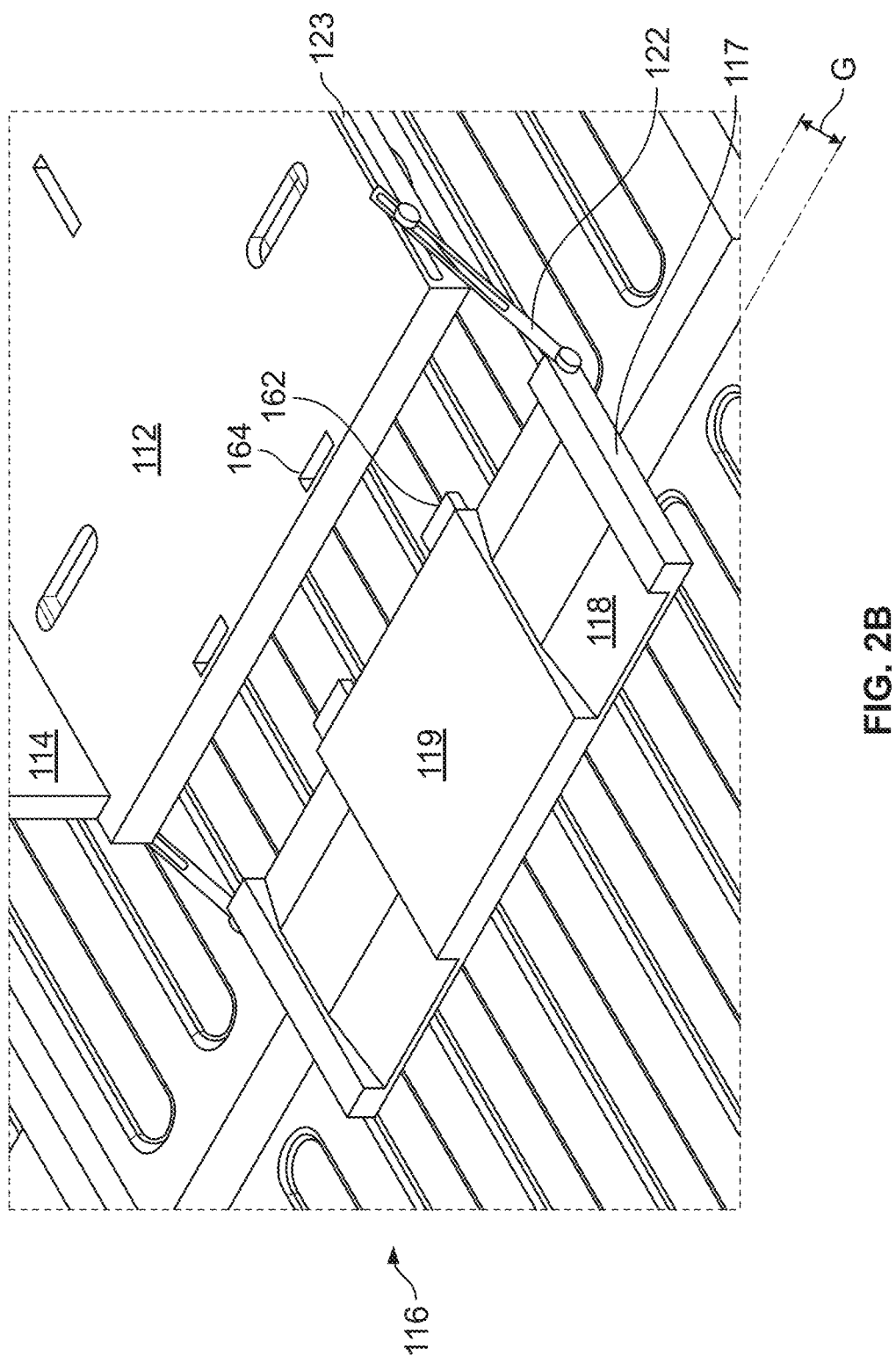
Figure 3:
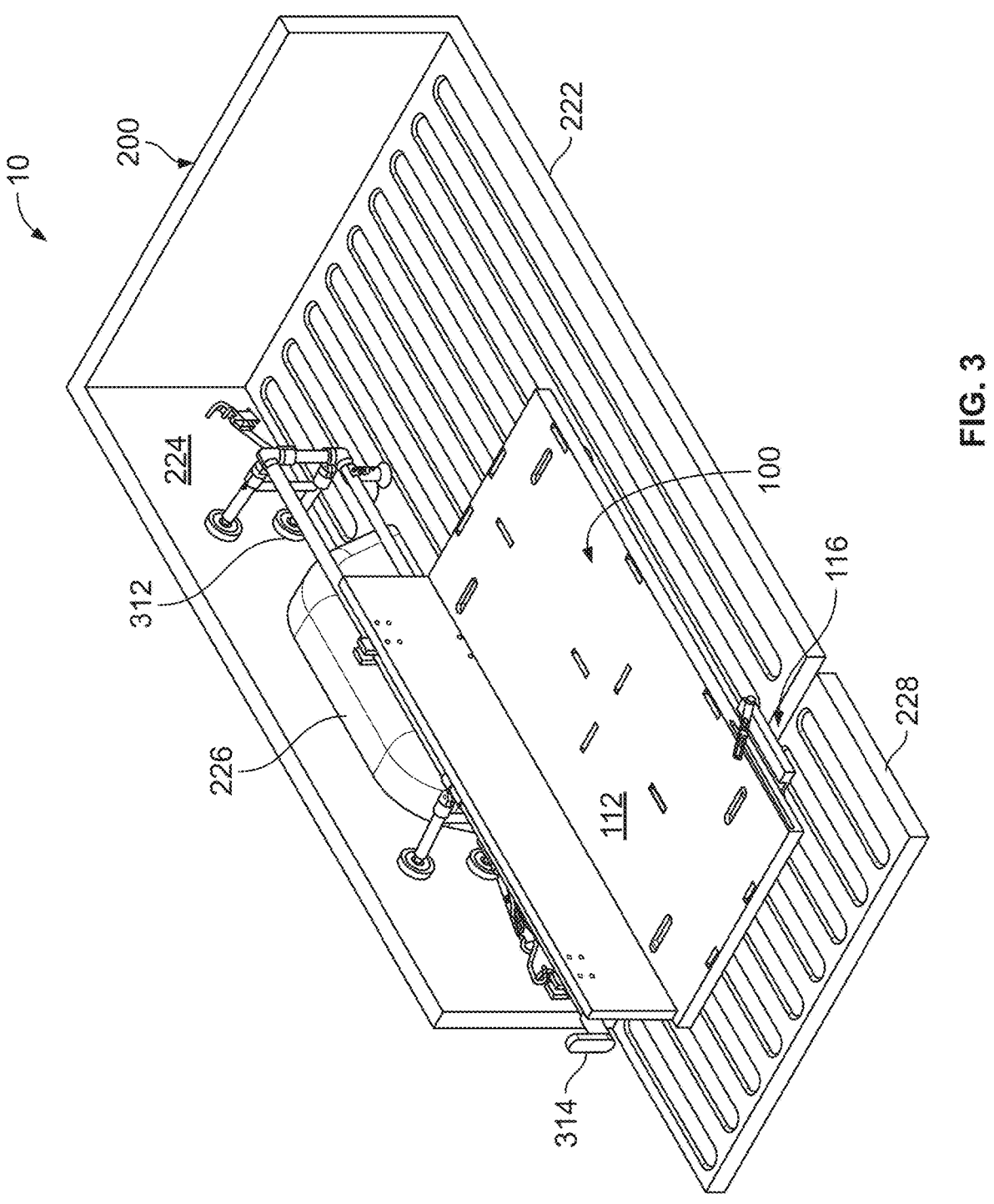
FIG. 3 is a top front right-side perspective view of the trolley system shown in FIG. 1 in an extended configuration in accordance with an embodiment of the invention.

FIGS. 1-3 illustrate, respectively, sequentially moving a trolley cart 100 from a retracted configuration for storing a golf bag to an extended configuration for receiving the golf bag in the truck bed 200, according to embodiments of the invention. Truck bed 200 is shown including a floor 222, trough 223, side wall 224, wheel well 226, and tailgate 228. The truck bed 200 is shown with the other components of the truck removed for facilitating understanding of the invention.

With initial reference to FIG. 1, a top front right-side perspective view of the trolley system 10 is shown in a retracted configuration in a truck bed 200 in accordance with an embodiment of the invention. In particular, a cart 100 including base 112 and side wall 114 is shown arranged in a retracted configuration with frame 300. Although only one side wall is shown in FIGS. 1-3, the invention is not intended to be so limited. The cart may comprise multiple walls and features and is intended to be limited only where specifically recited in any appended claims.

FIG. 1 also shows a frame 300 having a cage-like construction. The frame 300 is shown secured to the truck wall 224, over the wheel well 226, via ratcheting straps 332. However, as described herein, the frame may be secured to the truck bed via alternative means whether in a temporary or permanent manner.

With reference to FIG. 2A, a top front right-side perspective view of the trolley system 10 is shown in an intermediate configuration in which telescoping rail 312 is shown unlocked and extended.

The telescoping rail 312 is movable between a contracted and extended state. In its contracted state as shown in FIG. 1, the stop 314 of the telescoping rail 312, locks the trolley 100 in place for secure transportation. When the stop 314 is rotated, the telescoping rail 312 is extendable, serving as a guide for the trolley as it is moved onto the tailgate 228. Upon returning the trolley to its original position (e.g., the retracted configuration shown in FIG. 1), the telescoping rail 312 retracts and locks both the trolley and itself in place.

In embodiments, the rotatable stop 314 and telescoping guide 312 locks into place both in its contracted and extended position by internal ball locking mechanism.

FIG. 2A also shows a movable support 116, bridge, and in a sense, a drawbridge. The drawbridge 116 serves as both a barrier for securing payloads and a bridge for navigating the gap (G) between the truck bed 222 and the tailgate 228.

With reference again to FIG. 1, a handle 128 is shown on the drawbridge 116 for opening and lowering the drawbridge as described herein.

The drawbridge is removable and can be placed handle-side down in the crevasse (G) between the truck bed 222 and tailgate 228, creating a continuous path for the trolley.

With reference to the enlarged view shown in FIG. 2B, drawbridge 116 is shown coupled to the base 112 of the cart via hinges 122, and operable to allow the drawbridge to be raised and lowered across the gap (G).

Drawbridge is shown comprising edges 117, a main body 119, and tracks 118.

The tracks 118 of the drawbridge are recessed/relieved to accommodate the trolley wheels during this transition (and optionally aligning) the rollers of the cart across the drawbridge, described herein.

The hinges 122 are shown rotatably mounted on a first end to a point on the edge 117, and a rotatably mounted on a second end to a slot 123 of the base of the cart. As described herein this arrangement provides for the cart 100 to be rolled over the top of the drawbridge and to the fully extended configuration, described herein.

FIG. 2B also shows tabs 162 on the drawbridge which are insertable into holes 164 in the base 112. The tabs and holes are shaped and operable to align and interlock the drawbridge with the cart, and to form a chamber for holding the object such as a golf bag (not shown).

FIG. 3 is a top front right-side perspective view of the trolley system 10 shown in an extended configuration in the truck bed 200 in accordance with an embodiment of the invention.

As shown, the cart 100 has been moved the full length of the telescoping rail to stop 314, and the base 112 of the cart 100 is over the top of the drawbridge 116, spanning the gap between the truck bed floor 222 and tailgate 228. The stop 314 prevents the cart from sliding off the rail 312.

In an exemplary application, the user loads the object (e.g., a golf bag) onto the base 112 of the cart 100 while the cart is in the extended position. The user then slides the base 112 backwards into the retracted position shown in FIG. 1B, and locks the base in place by rotating stop 314.

Next, the user manually raises the drawbridge 116, namely, closes the cart 100.

Finally, the user closes the truck tailgate 228.

To unload the object, the user carries out the same steps except they would remove the object instead of placing the object into the cart.

Frame

Figure 4:
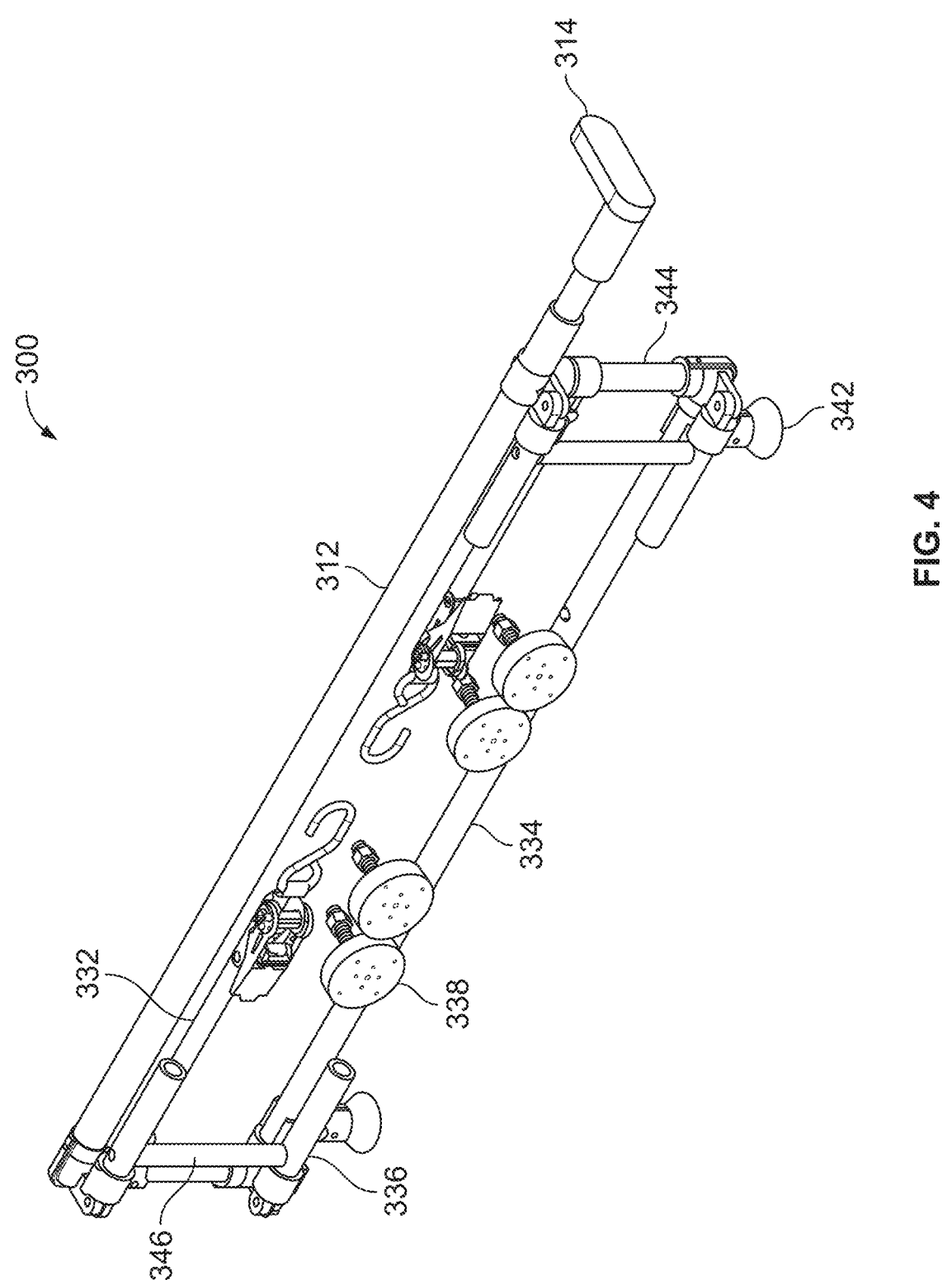
FIGS. 4-6 are illustrations of a frame of a trolley system in a folded, intermediate and deployed configuration, respectively, in accordance with an embodiment of the invention.
Figure 5:
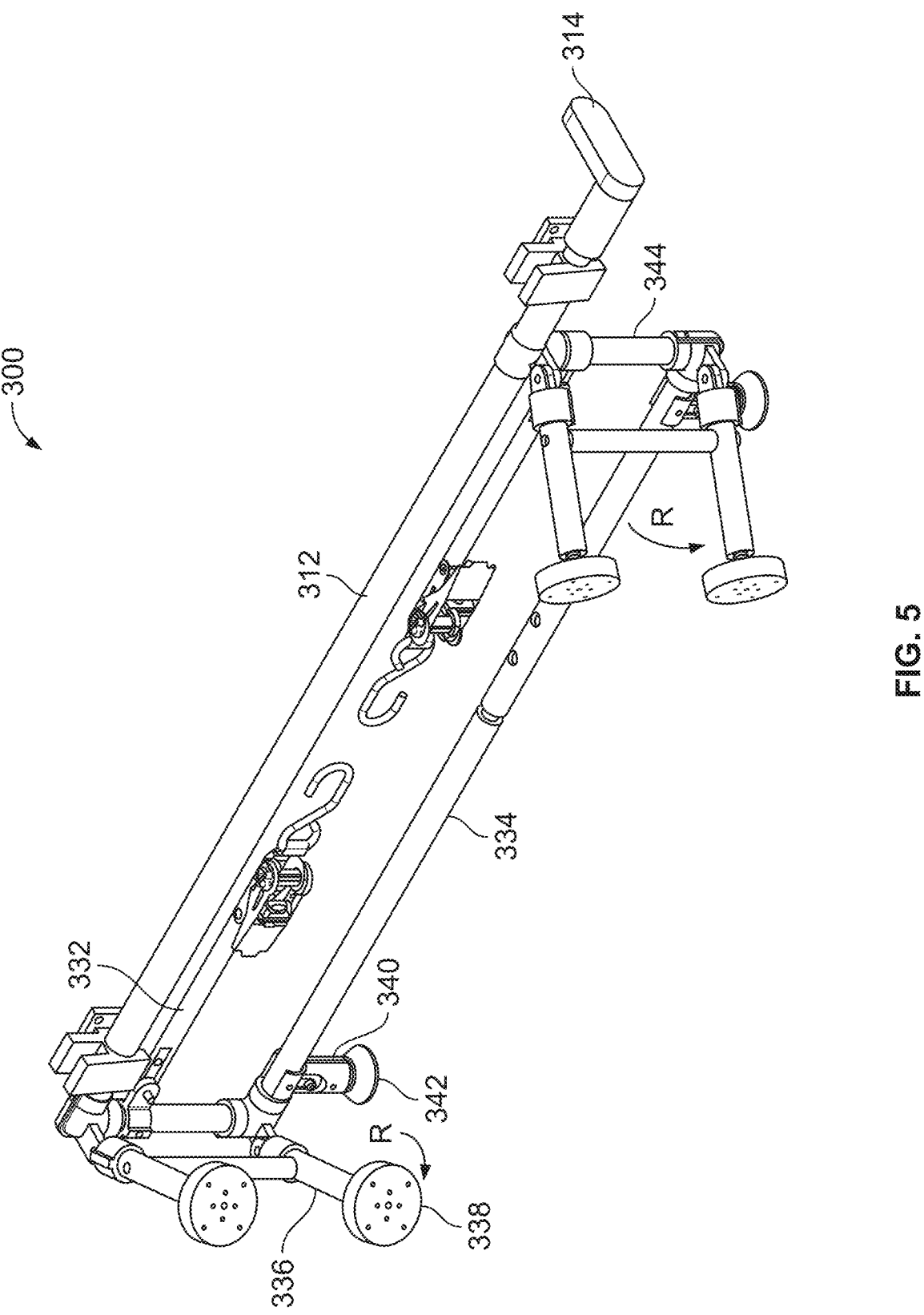
Figure 6:
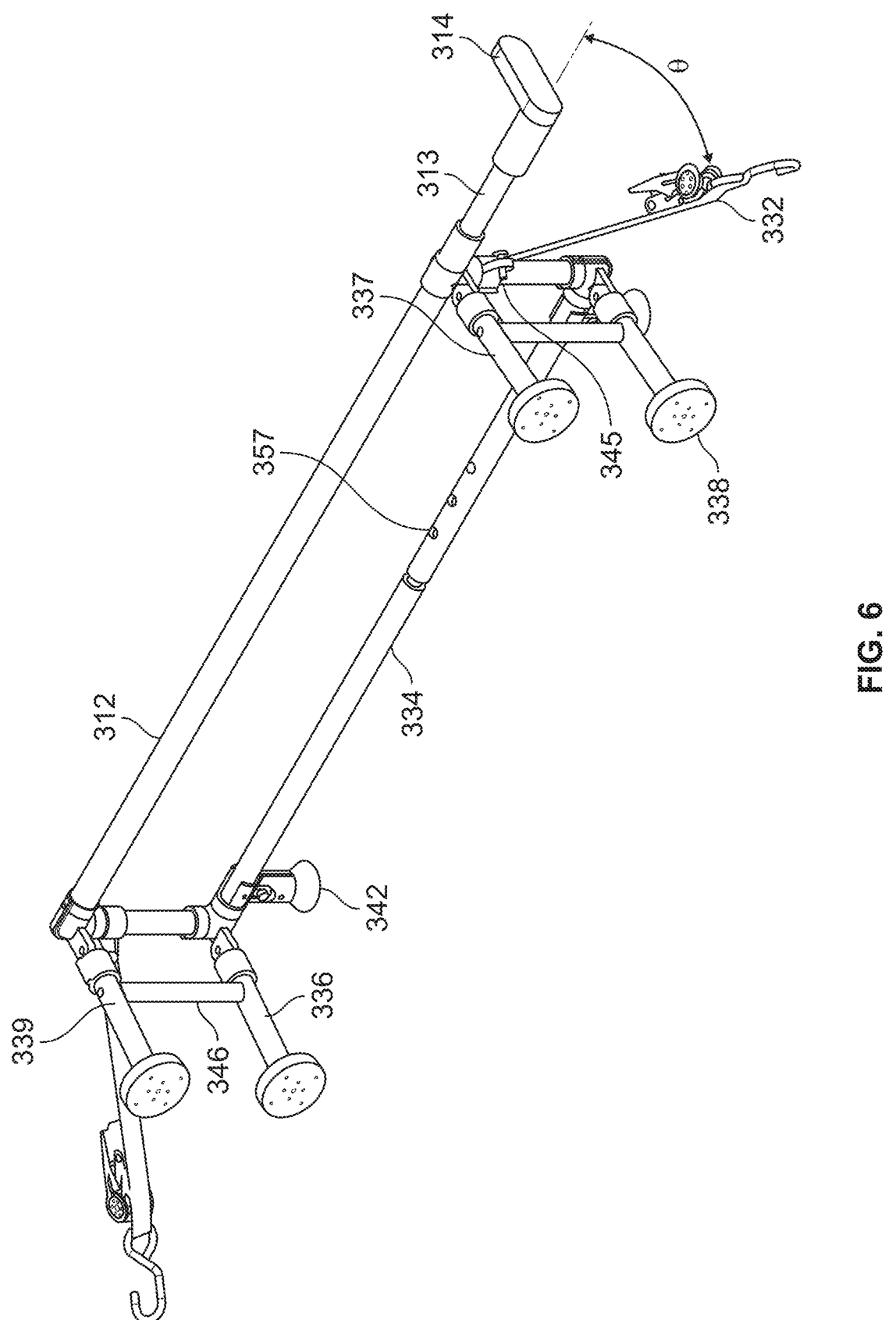

FIGS. 4-6 are illustrations of a frame 300 of a trolley system in a folded, intermediate and deployed configuration, respectively, in accordance with an embodiment of the invention. The frame 300 is shown comprising a plurality of members including upper telescoping rail 312, stop 314, lower rail 334, and main cross member 344 which joins the upper rail to the lower rail. Preferably, the members are constructed from rigid materials, such as lightweight metals (e.g., a tubular steel or aluminum), plastics, or hardened composites, with sufficient structural integrity to stabilize and guide a cart or trolley within the bed of a pickup truck as described herein.

In FIG. 4, the frame 300 is in a folded (portable or collapsed configuration) in which legs 336 are folded towards the main rails 312, 334. Straps (e.g., nylon straps with hooks and ratcheting locks) are shown parallel to the rails 312, 314. Foot pads 338 are shown disconnected from legs 336. Upper rail 312 is in a retracted configuration (i.e., not extended).

FIG. 5 shows the frame 300 in an intermediate configuration in which the foot pads 338 have been installed on the legs 336, and the legs are in the process of the being rotated (R) open.

FIG. 6 shows the frame 300 in a deployed configuration in which the legs 336 are fully rotated open and straps 332 are shown extending from a ratchet connector 345 at an angle (theta). The angle (theta) may vary and be dependent at least in part on the location of the eyelet loops of the truck bed (not shown). However, in embodiments, the rails 312, 334 may be adjusted in length which can adjust the angle formed between the straps and the frame. In embodiments, the system is operable to create an angle (theta) ranging from 30 to 60 degrees.

Additionally, in embodiments, the legs 336 are adjustable in length to accommodate different truck bed shapes, and are equipped with padded ends, serving to protect the truck bed's interior. In embodiments, each leg 336 is reinforced with a cross member 346 to enhance stability and rigidity.

In embodiments, the frame includes one or more lower rail legs 342, serving to elevate the frame slightly above the truck bed floor.

In embodiments, one or more of the legs, cross members and rails are adjustable in length. For example, lower rail 344 may include two elongate tubular members comprising end sections which slidably engage with one another. An inner end section may comprise spring loaded tabs which are releasably deployable in openings (e.g., openings 357) of the outer end section. The length of the rail 334 may be adjusted and set by selecting and engaging the tab of the inner end section with the selected opening of the outer end section of the rail 334.

Figure 7:
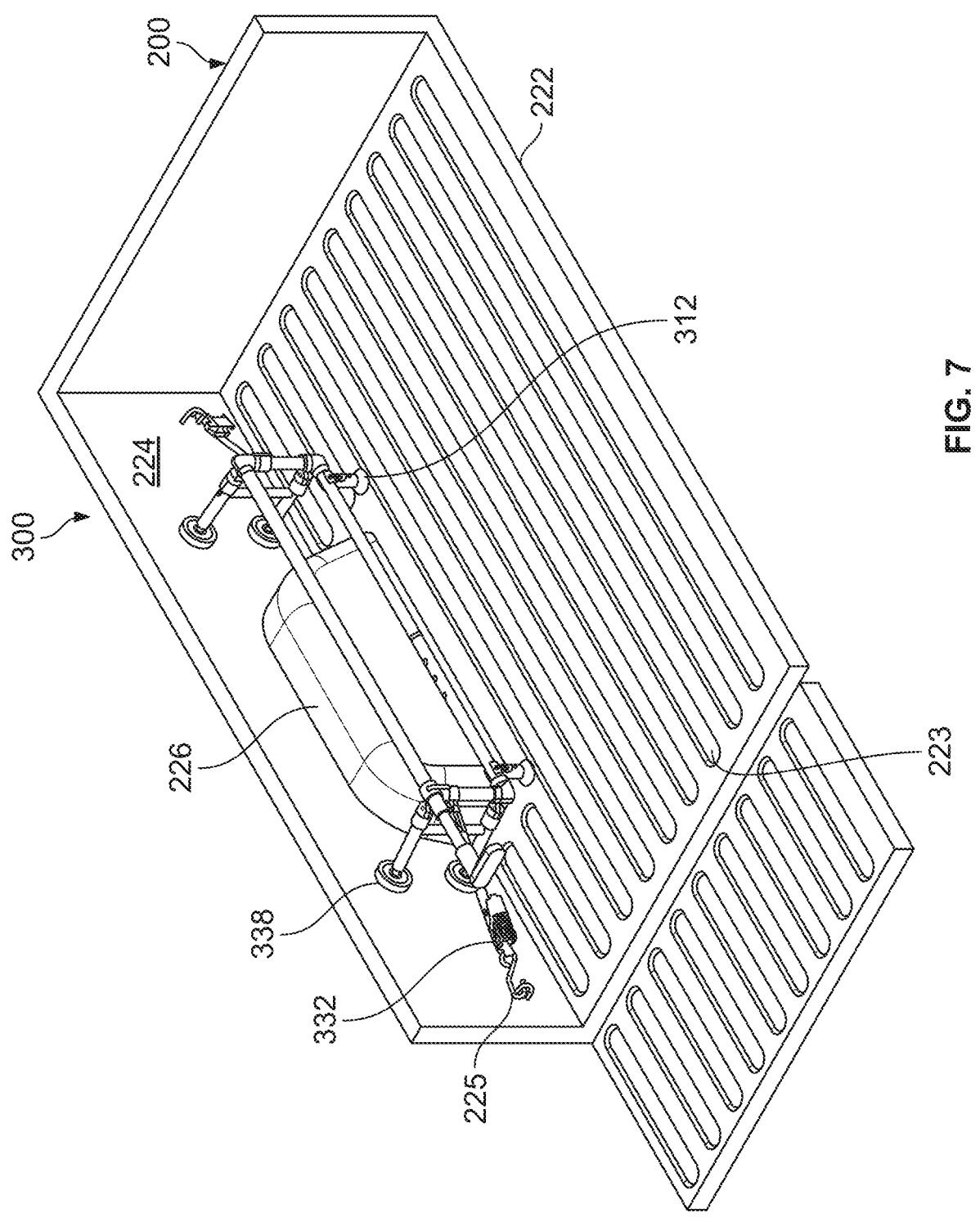
FIGS. 7-8 are illustrations of a frame of a trolley system installed in a truck bed in accordance with various embodiments of the invention.

With reference to FIG. 7, and as described herein, the frame 300 may be secured using straps 332. Truck bed straps 332 may be made of durable materials such as nylon may be attached to adjustable locations on the cage 300 and secured to various locations (e.g., tie-down 225) within the truck's bed. In embodiments, a ratcheting system is employed to create sufficient tension to ensure the cage 300 remains stable against the interior of the truck's bed.

Figure 8:
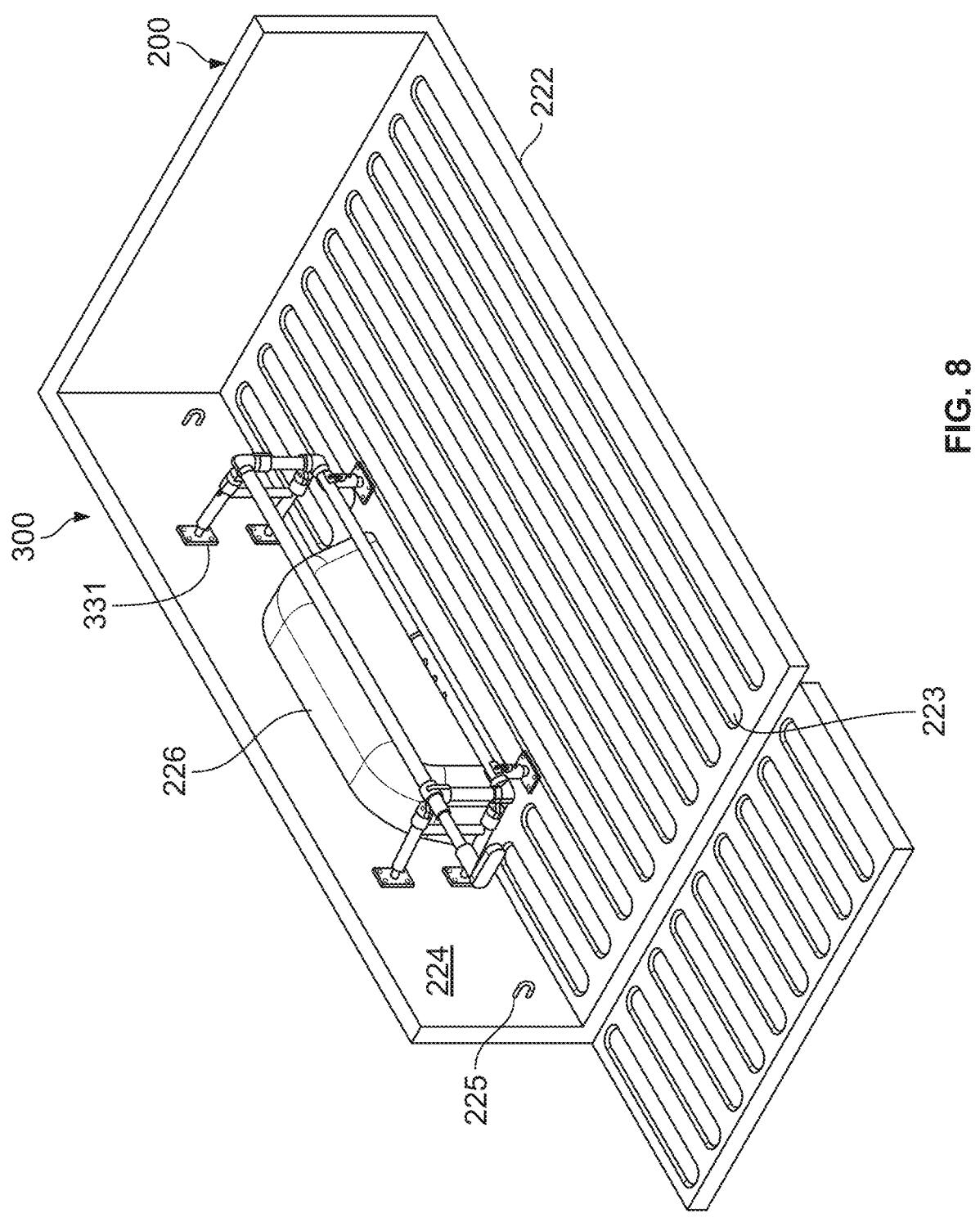

FIG. 8 shows frame 300 permanently attached to the truck bed using fasteners and brackets 331. However, the invention is not intended to be so limited. Other modalities for securing the frame to the truck bed may be employed so long as the attachment method is robust enough to maintain the system's position during use, eliminating the need for straps. For example, the plates or brackets may be mounted to the truck bed itself, and the frame legs fastened to the brackets by e.g., screws.

In a preferred design, brackets are permanently mounted to the truck bed, and the legs are releasably engaged with a slot or recess in the bracket. For example, the bracket may include a spring-biased clip which prohibits each leg from disengaging from a slot unless the user manually disengages the spring. Thus, the frame may be manually installed and removed tool-free.

Cart

Figure 9:
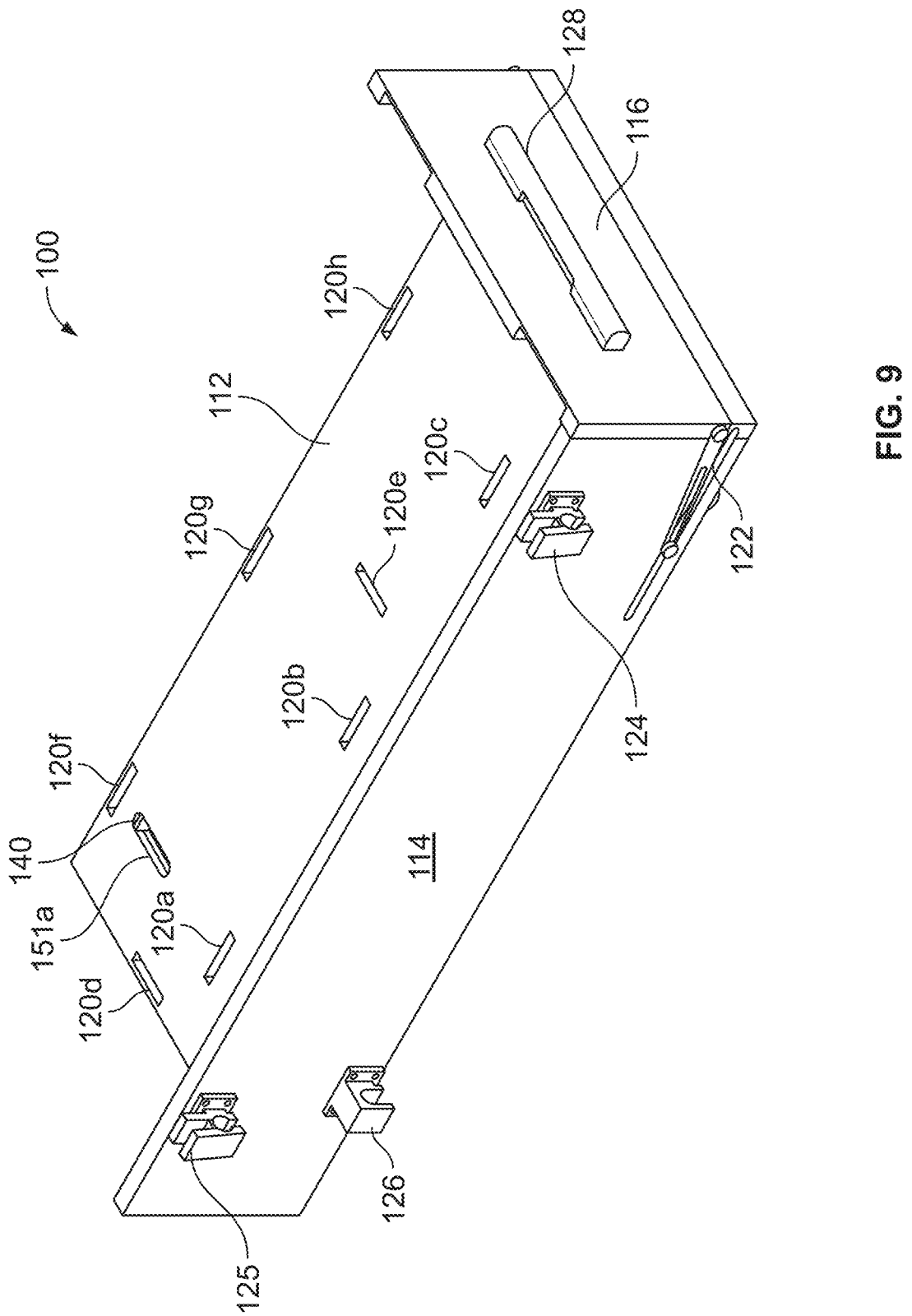
FIGS. 9-10 show, respectively, an upper and lower left-side perspective view of a cart in accordance with an embodiment of the invention.
Figure 10:
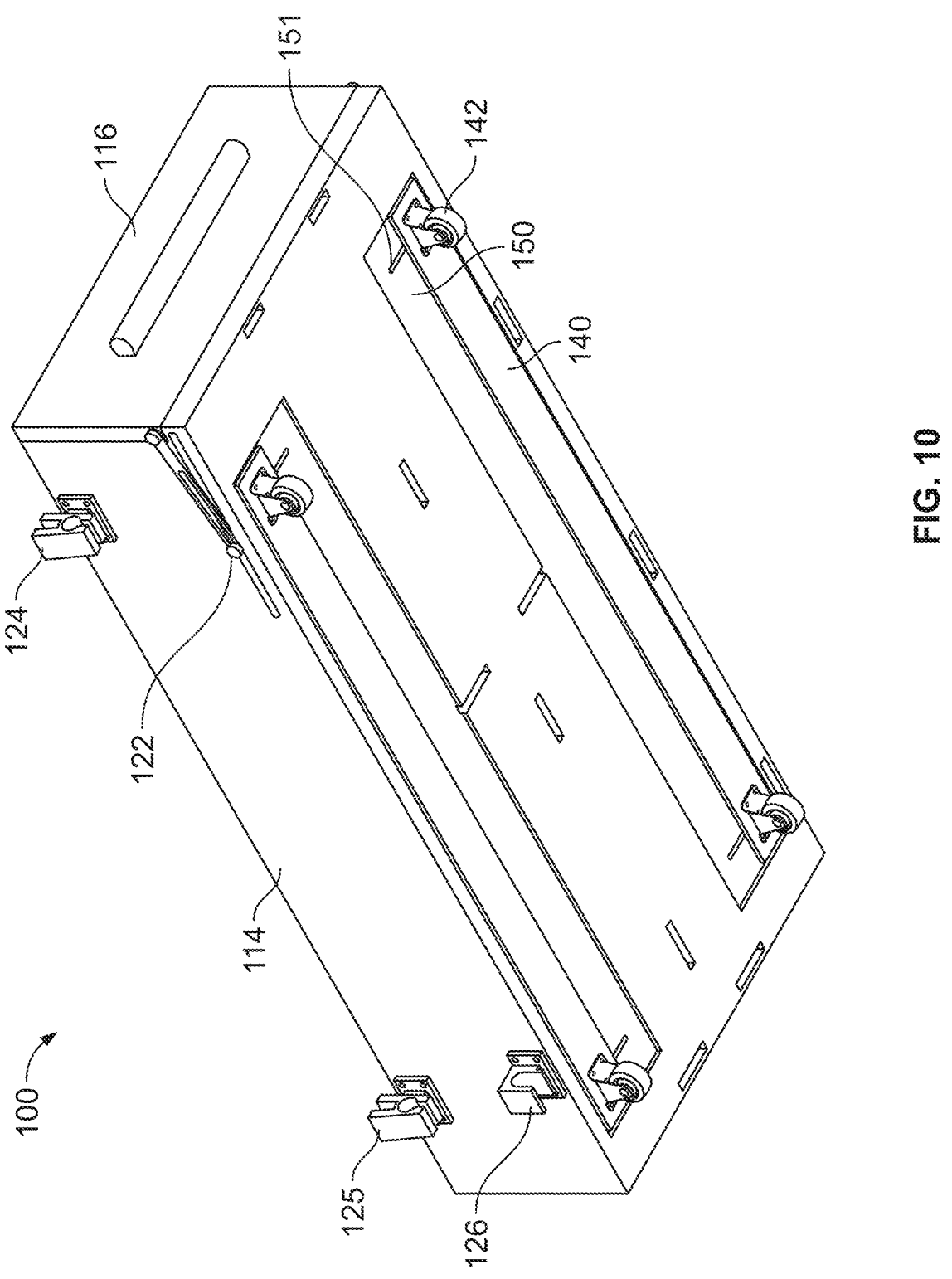

With reference to FIGS. 9-10, a trolley 100 is shown in accordance with an embodiment of the invention. The trolley (also referred to as a cart) 100 is shown including a base member 112 upon which an object may sit. A side wall 114 and front drawbridge 116 serve to hold or enclose an object in the cart. The cart may be constructed from light-weight yet durable materials such as hardened plastic, allowing for ease of movement.

In embodiments, the trolley bed or base member 112 includes a plurality of holes (e.g., holes 120a-120i) for customizable partitioning, defining the number of chambers, and accommodating various payloads, described herein with reference to FIGS. 14A-14D.

FIG. 10 is a bottom view of the cart 100. The cart 100 is equipped with an underside wheel system 140 including rollers 142 for movement along the truck bed. A cutout is shown 150 for allowing the wheel system 140 to be laterally adjusted. The user may move the wheel assembly through a slit 151a, 151b in the base. It may be locked in place by, e.g., a wingnut or another faster system. The wheel system 140 is sized and adjustable to align with the troughs 223 of the truck's bed structure. The rollers 142 directly contact and roll along the troughs in the truck bed. The weight of the object and cart are thus transferred onto the truck bed and not the guide rails of the frame. This is an advantage to accept heavier objects without risking damage to the frame. In embodiments, the wheels are sized to match the width of the troughs in the bed.

Fixed Inner Wall and Bearing Clips:

FIGS. 9-10 also show guides 124, 125, 126 secured to fixed inner wall 114. The guides can be in the form of a clip, and optionally include bearings. As described herein the guides serve to lead or direct the cart along the frame 300.

Figure 11:
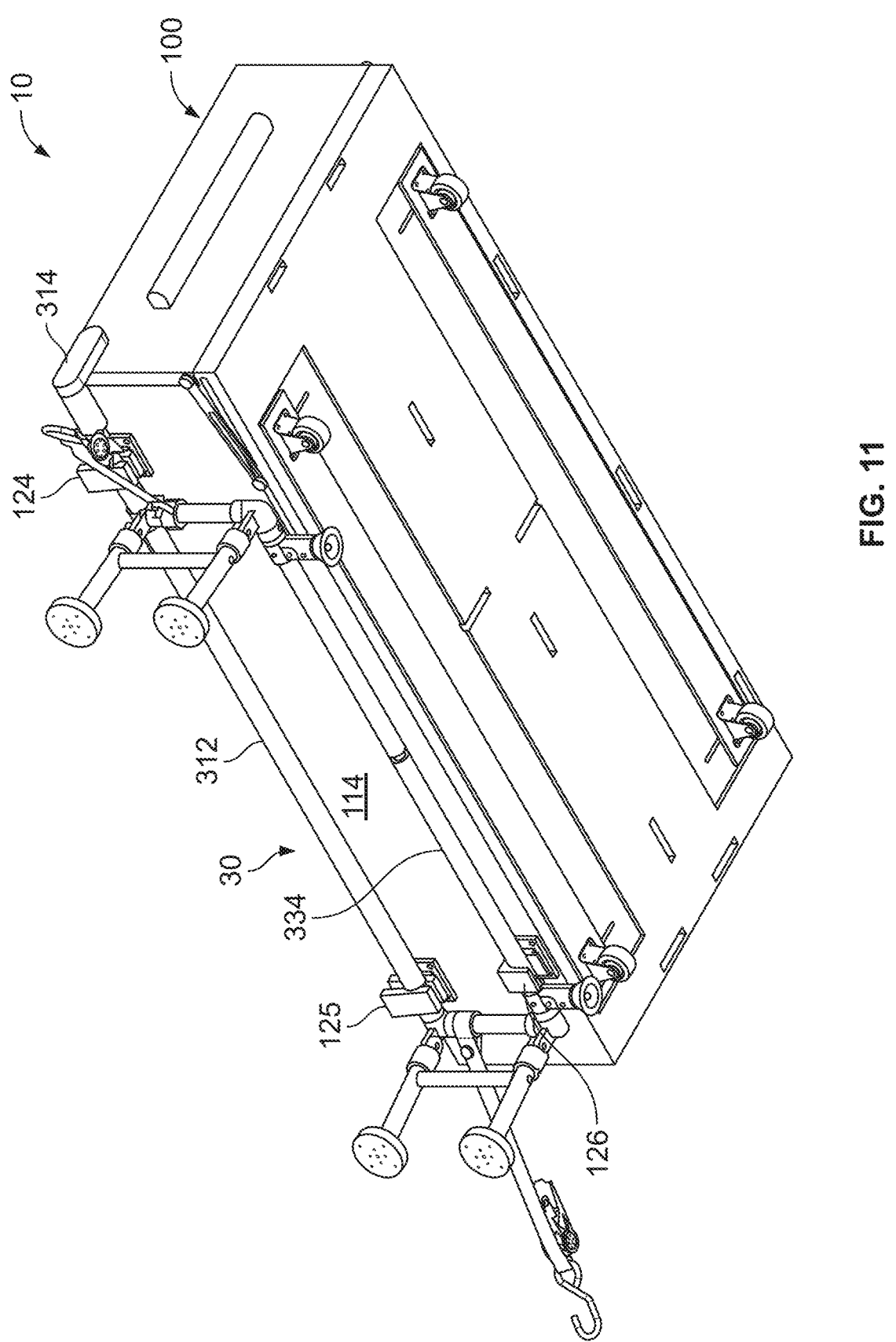
FIGS. 11-13 show various views of a trolley system with the truck bed removed in accordance with an embodiment of the invention.
Figure 12:
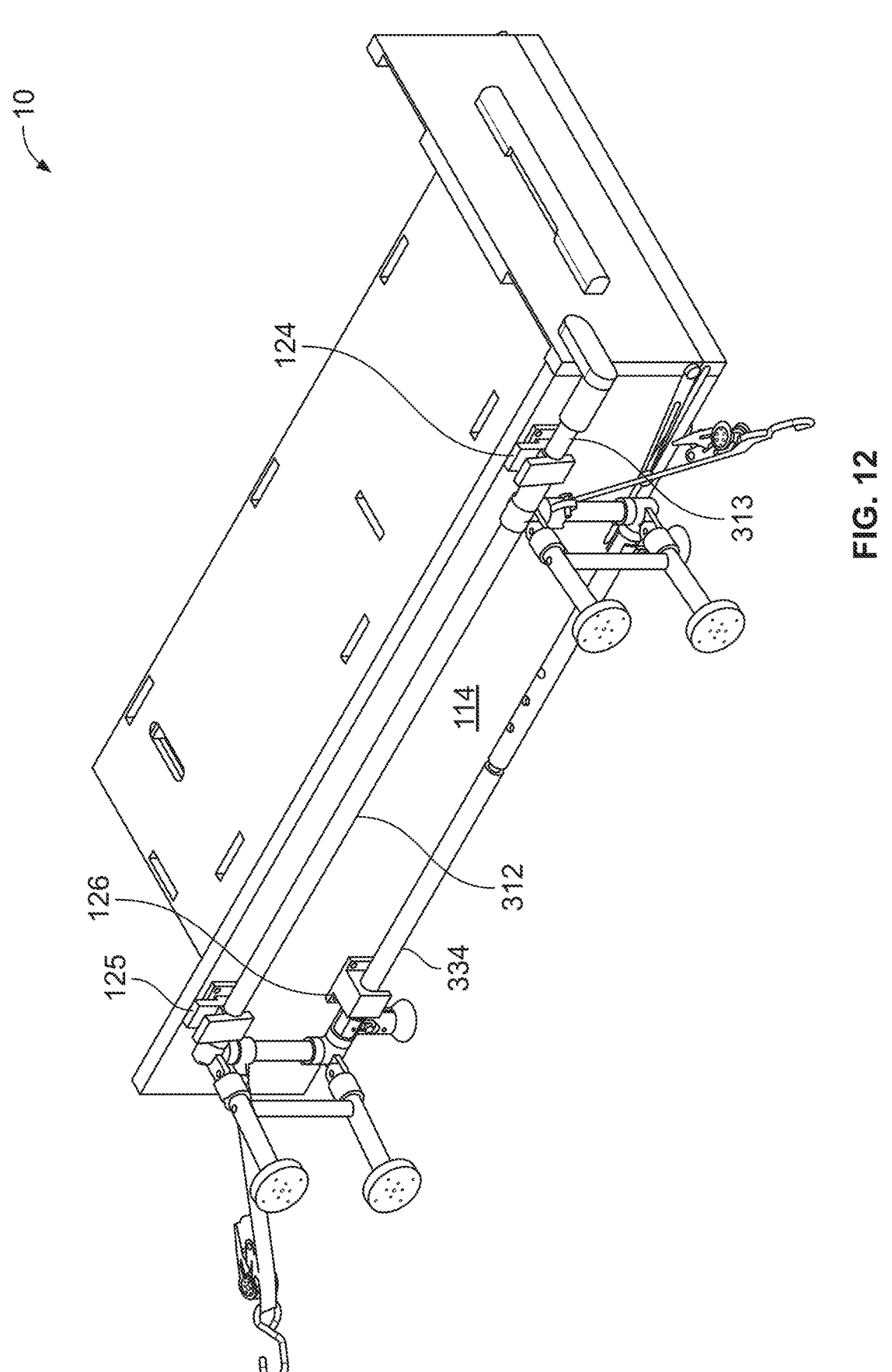
Figure 13:
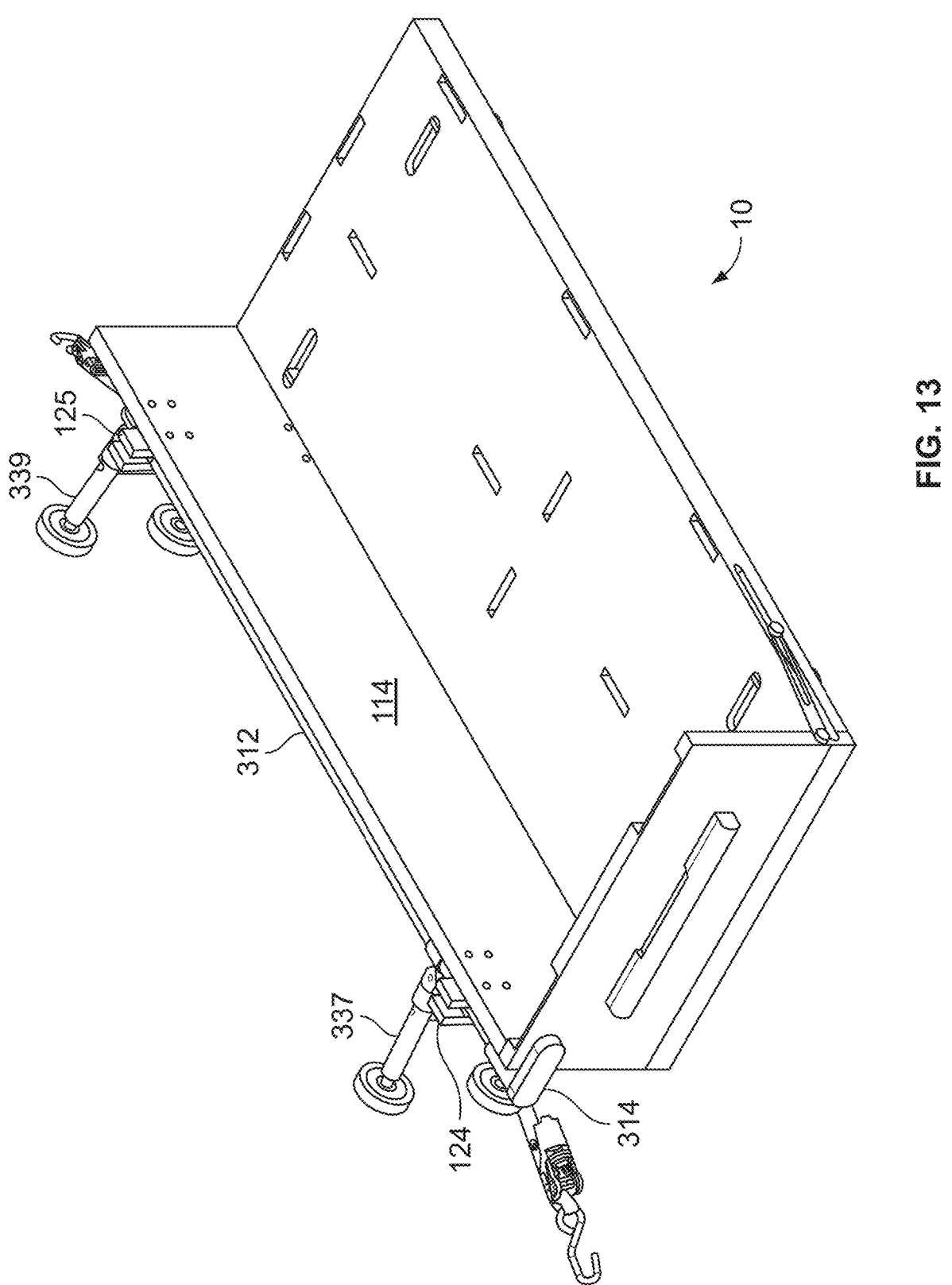

With reference to FIGS. 11-13, the cart 100 is shown in cooperating engagement with the frame 300. As shown, the inner wall 114 of the cart 100 includes clips 124, 125, 126 that secure the trolley to the rails 312, 334 of frame 300, enabling smooth gliding along the rails. Clips 124, 125 also act as stops, restricting the trolley's range of motion along the frame between the legs 337, 339 or stop 314 whichever is contacted first. The clips are preferably formed of a rigid material such as a hard plastic or metal. They may be machined or molded. In embodiments, the clips are adjustable via a screw or other tightening or securing means and replaceable for wear and tear.

ALTERNATIVE EMBODIMENTS

Although various embodiments have been described, the invention may vary and many different embodiments are intended to be included within the scope of the invention except where explicitly excluded by any appended claims.

For example, with reference to FIGS. 14A-14D, the walls of the cart may be positioned in various configurations to more effectively contain payloads.

Figures 14A, 14B, 14C, 14D:
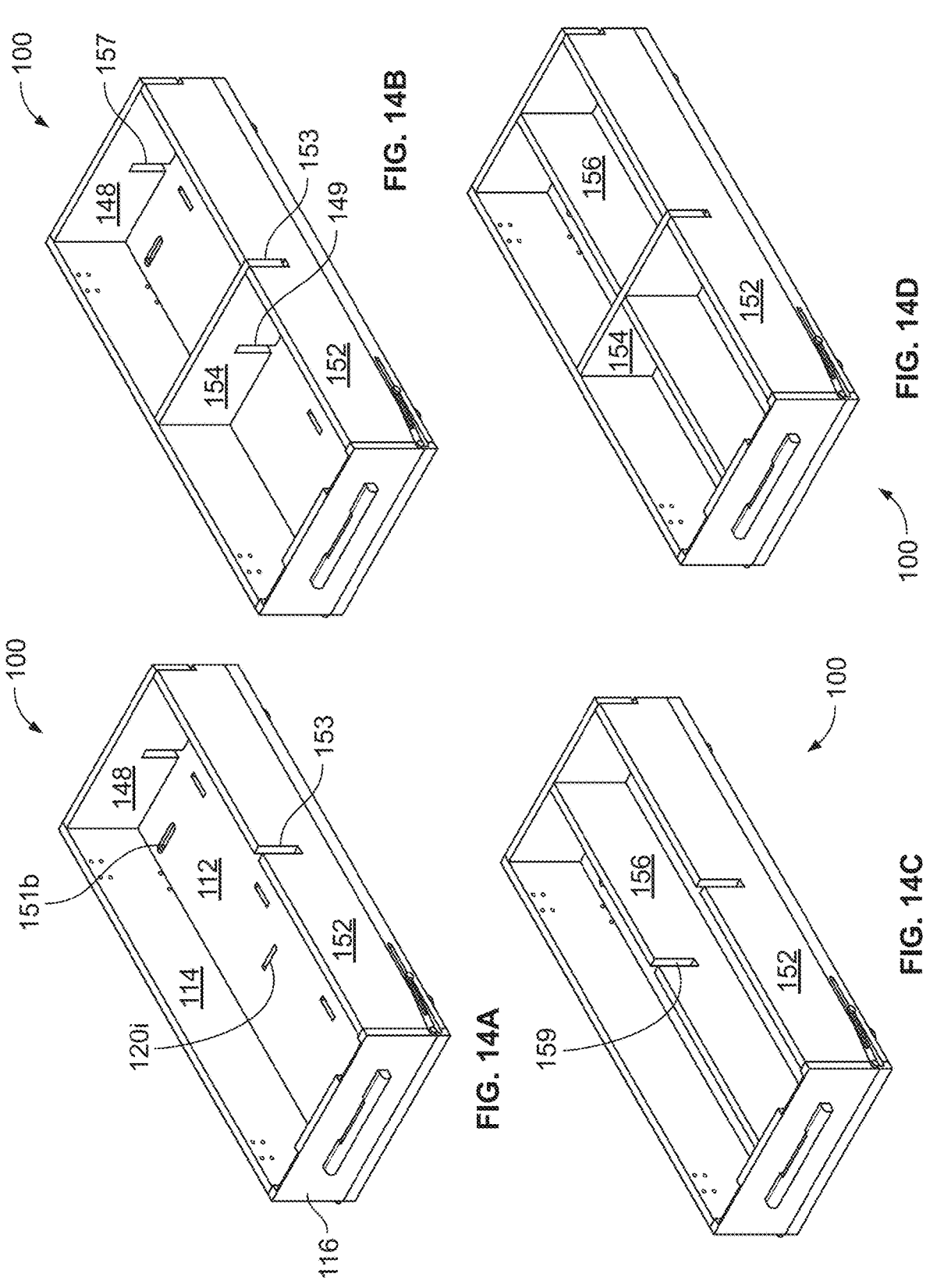
FIGS. 14A-14D are top right-side perspective views of a cart arranged in different chamber configurations in accordance with embodiments of the invention.

For example, FIG. 14A shows four walls 114, 148, 152, and 116 defining a single chamber.

FIG. 14B shows a two-chamber cart design defined by laterally-arranged first divider 154. First divider 154 includes an edge that mates with a cutout 153 in side wall 152. As described herein, holes (e.g., hole 120i) in the base plate 112 are operable to receive lower tabs in the first divider 154. The lower tabs in the walls are sized and shaped to interlock with the holes in the base 112.

FIG. 14C shows another two-chamber cart design in which a second divider 156 is longitudinally arranged and secured to the base plate 112 and the rear wall 148 via a slot 157 in the wall 148 and holes in the base plate 112. Second divider 156 includes a rear edge that mates with a cutout 157 in rear wall 148.

FIG. 14D shows a four-chamber cart design in which both the first divider 154 and the second divider 156 are installed as described above, and a cut out 159 in the second divider mates with a cutout 149 in the first divider.

The flexible and adjustable wall configurations allow for chambers to be designed specific for the user payload. This is an advantage of some embodiments of the invention.

Figures 15A, 15B:
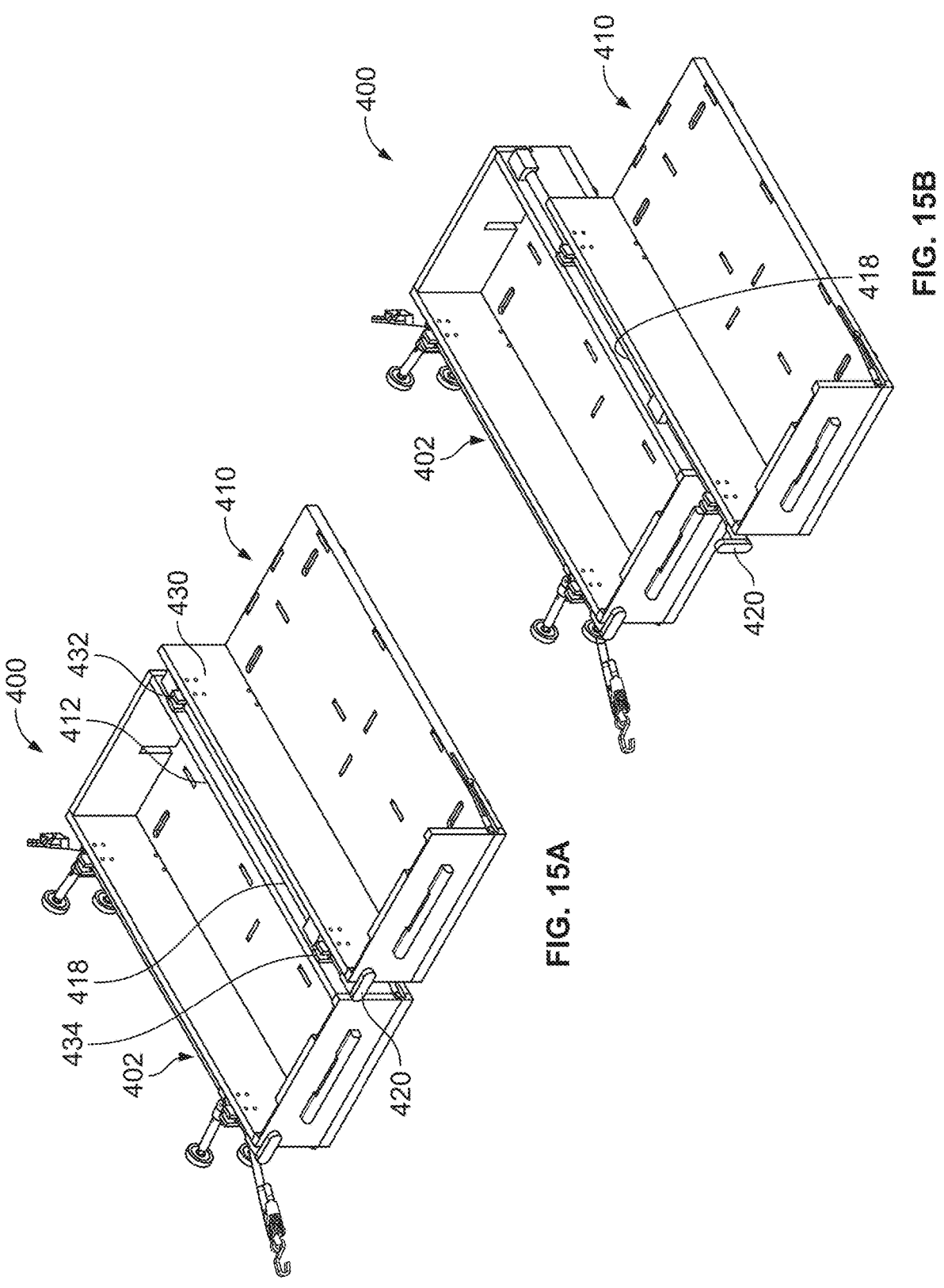
FIGS. 15A-15B are top right-side views of a trolley system comprising a second cart in a retracted and extended configuration, respectively, in accordance with an embodiment of the invention.

FIGS. 15A-15B are top right-side views of a trolley system comprising first cart 400 and a second cart 410 in a retracted and extended configuration, respectively, in accordance with embodiments of the invention.

The side wall 412 of the first cart 400 is shown comprising an additional rail system 418, 420 for supporting guides 432, 434 of second trolley 410. The guides 432, 434 are mounted to fixed wall 430 of the second trolley 410 and track the second rail 418 similar to how the first trolley 400 tracks the first frame rail 402.

The modular and adaptable design shown in this embodiment of the invention serves to meet diverse payload requirements while providing secure and efficient loading and unloading in various pickup trucks.

Other modifications and variations can be made to the disclosed embodiments of the invention without departing from the subject invention. For example, while the guides and clips have been shown on the cart in many of the above described embodiments, in other embodiments, the guides and clips are arranged on the portable frame, and the cart includes a rail which is tracked by the guides. For example, although many of the embodiments described above refer to the rail secured to the truck bed and the clips to the trolley cart, in other embodiments, the rails are mounted to the cart, and the clips (or equivalent) are securely arranged with the truck bed to guide the rail (and cart) into and out of the bed of the truck.

I claim:

1. A trolley system for storing an object in a truck bed comprises:
   a frame securable to a wall of the truck bed; and
   a first cart comprising a base, a first side wall, and a plurality of rollers arranged on the base, wherein said first cart is operable with the frame and the truck bed to contact and roll the first cart directly along the truck bed between a retracted configuration for storing the object in the truck bed and an extended configuration for receiving the object; and
   wherein the frame comprises a cage-like structure that is arranged over a wheel well of the truck bed.

2. The system of claim 1, wherein the first cart comprises a drawbridge operable between a first position closing the front of the first cart, and a second position, over which the first cart may roll across a gap formed between the truck bed and a tailgate when the tailgate is open.

3. The system of claim 2, wherein the drawbridge is in pivotable, optionally hinged, engagement with a side wall of the first cart.

4. The system of claim 3, wherein the drawbridge comprises tracks within which the rollers of the first cart align and travel across.

5. The system of claim 1, wherein the frame comprises an extendable first rail and a stop arranged at an end of the first rail, and wherein a guide of the first cart and first rail cooperate together to guide the cart out of the truck bed until the first cart contacts the stop.

6. The system of claim 5, wherein rotation of the stop causes the first rail to lock and unlock.

7. The system of claim 1, wherein the frame comprises a plurality of legs, and optionally, wherein each of the legs comprises a foot pad.

8. The system of claim 1, wherein the frame is collapsible into a folded configuration.

9. The system of claim 8, wherein the frame is secured to the truck bed via a strap ratcheting system or mounting brackets.

10. The system of claim 1, wherein the first cart comprises slots or tabs for supporting walls in multiple different configurations.

11. The system of claim 1, wherein the first cart comprises a second side wall opposite of the first side wall.

12. The system of claim 11, further comprising a second rail system disposed on an exterior of the second side wall for guiding a second cart.

13. The system of claim 12, further comprising the second cart movable between a retracted configuration for storing the object in the truck bed and an extended configuration for receiving the object.

14. The system of claim 1, wherein the first cart is shaped and sized to accommodate a golf bag.

15. A trolley system for storing an object in a truck bed comprises:
   a frame securable to a wall of the truck bed;
   a first cart comprising a base, a first side wall, and a plurality of rollers arranged on the base, wherein said first cart is operable with the frame and the truck bed to contact and roll the first cart directly along the truck bed between a retracted configuration for storing the object in the truck bed and an extended configuration for receiving the object;
   wherein the frame further comprises an extendable first rail and a stop arranged at an end of the first rail, and wherein a guide of the first cart and first rail cooperate together to guide the cart out of the truck bed until the first cart contacts the stop; and
   wherein the frame further comprises a second rail lower than the first rail, and wherein the at least one guide on the first cart comprises a plurality of guides at least one of which cooperates with the lower rail to support the first cart tracking into and out of the truck bed.

16. The system of claim 15, wherein each of the guides is clip-shaped.

17. A trolley system for storing an object in a truck bed comprises:
   a frame securable to a wall of the truck bed;
   a first cart comprising a base, a first side wall, and a plurality of rollers arranged on the base, wherein said first cart is operable with the frame and the truck bed to contact and roll the first cart directly along the truck bed between a retracted configuration for storing the object in the truck bed and an extended configuration for receiving the object; and
   wherein the position of the rollers along the base is adjustable for aligning the rollers with grooves in the truck bed.

18. The system of claim 17, wherein the frame comprises a cage-like structure that is arranged over a wheel well of the truck bed.

19. A trolley system for storing an object in a truck bed comprises:
   a frame securable to a wall of the truck bed; and
   a first cart comprising a base, a first side wall, and a plurality of rollers arranged on the base, wherein the first cart and plurality of rollers are operable with the frame and the truck bed to contact and roll the first cart directly along the truck bed between a retracted configuration for storing the object in the truck bed and an extended configuration for receiving the object, and
   wherein the frame comprises an extendable first rail and a stop arranged at an end of the first rail, and wherein a guide of the first cart and first rail cooperate together to guide the cart out of the truck bed until the first cart contacts the stop; and
   wherein rotation of the stop causes the first rail to lock and unlock.

20. A trolley system for storing an object in a truck bed comprises:
   a first cart comprising a base, a first side wall, and a second side wall opposite of the first side wall, and a plurality of rollers arranged on the base;

a first guide rail system securable to a wall of the truck bed and cooperating with the first cart to guide and roll the first cart directly along the truck bed between a retracted configuration for storing the object in the truck bed and an extended configuration for receiving the object; and a second rail system disposed on an exterior of the second side wall for guiding a second cart.

21. The system of claim 20, further comprising the second cart movable between a retracted configuration for storing the object in the truck bed and an extended configuration for receiving the object.

* * * * *